(12) United States Patent
Hirabayashi

(10) Patent No.: US 9,470,200 B2
(45) Date of Patent: Oct. 18, 2016

(54) STARTER ADAPTED TO IDLE STOP SYSTEM OF VEHICLE

(71) Applicant: DENSO CORPORATION, Kariya, Aichi-pref. (JP)

(72) Inventor: Takashi Hirabayashi, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 176 days.

(21) Appl. No.: 14/257,366

(22) Filed: Apr. 21, 2014

(65) Prior Publication Data
US 2014/0311435 A1    Oct. 23, 2014

(30) Foreign Application Priority Data

Apr. 23, 2013  (JP) .................................. 2013-090303

(51) Int. Cl.
| | |
|---|---|
| *F02N 11/08* | (2006.01) |
| *F02N 15/06* | (2006.01) |
| *H01H 51/06* | (2006.01) |
| *H01H 50/54* | (2006.01) |
| *F02N 11/10* | (2006.01) |

(52) U.S. Cl.
CPC ......... *F02N 11/087* (2013.01); *F02N 11/0851* (2013.01); *F02N 15/067* (2013.01); *H01H 51/065* (2013.01); *F02N 11/0825* (2013.01); *F02N 11/108* (2013.01); *F02N 2011/0874* (2013.01); *F02N 2200/14* (2013.01); *H01H 50/543* (2013.01)

(58) Field of Classification Search
CPC ............... F02N 11/087; F02N 15/067; F02N 11/0851; F02N 11/108; F02N 2200/14; F02N 11/0825; F02N 2011/0874; H01H 50/543; H01H 51/065

USPC ................. 123/179.3, 179.25, 179.4, 179.1, 123/179.22, 179.28
See application file for complete search history.

(56) References Cited

U.S. PATENT DOCUMENTS

| | | | | |
|---|---|---|---|---|
| 2,020,749 | A | * | 11/1935 | Watson ................... F02N 11/08 290/37 R |
| 4,606,307 | A | * | 8/1986 | Cook ................... F02N 11/0803 123/179.16 |

(Continued)

FOREIGN PATENT DOCUMENTS

JP    A-2011-144799    7/2011

*Primary Examiner* — Joseph Dallo
(74) *Attorney, Agent, or Firm* — Oliff PLC

(57) ABSTRACT

An electromagnetic solenoid of a starter includes: a main solenoid forming an electromagnet to pull a plunger when being energized, a contact unit that controls the motor current ON and OFF.

The contact unit includes a motor power switch including fixed contacts and a movable contact driven by the main solenoid; a regulation member disposed to be movable between a regulated position and a released position and a sub solenoid that drives the regulation member to the regulated position and releases the regulation member to the released position.

The sub solenoid drives the regulation member to the regulated position before the motor power switch is closed to regulate movement of the movable contact and releases the regulation member to the released position when a predetermined time elapses after the plunger is pulled by the electromagnet to release the movable contact.

12 Claims, 10 Drawing Sheets

(56) References Cited

U.S. PATENT DOCUMENTS

| | | | | |
|---|---|---|---|---|
| 7,218,010 B2 * | 5/2007 | Albertson | | F02N 11/0855 290/38 R |
| 8,237,524 B2 * | 8/2012 | Niimi | | F02N 15/067 335/126 |
| 8,289,110 B2 * | 10/2012 | Niimi | | F02N 11/087 335/126 |
| 8,344,837 B2 * | 1/2013 | Niimi | | H01H 51/065 335/281 |
| 8,492,916 B2 * | 7/2013 | Murata | | F02N 11/087 290/38 R |
| 2005/0099009 A1 * | 5/2005 | Spellman | | F02N 11/0851 290/38 R |
| 2008/0127927 A1 * | 6/2008 | Hirning | | F02N 11/0855 123/179.3 |
| 2008/0162007 A1 * | 7/2008 | Ishii | | F02N 11/0855 701/54 |
| 2010/0251852 A1 * | 10/2010 | Murata | | F02N 11/0844 74/7 A |
| 2011/0084786 A1 * | 4/2011 | Niimi | | F02N 15/067 335/177 |
| 2011/0095852 A1 * | 4/2011 | Niimi | | F02N 11/087 335/184 |
| 2011/0187127 A1 * | 8/2011 | Murata | | F02N 11/087 290/38 C |
| 2011/0203410 A1 * | 8/2011 | Notani | | F02N 11/0851 74/7 R |
| 2011/0273811 A1 | 11/2011 | Plaideau | | |
| 2012/0049989 A1 * | 3/2012 | Niimi | | H01H 51/065 335/282 |
| 2012/0206220 A1 * | 8/2012 | Niimi | | H01H 51/065 335/71 |
| 2012/0242431 A1 * | 9/2012 | Nawa | | H01H 3/001 335/185 |
| 2013/0027157 A1 * | 1/2013 | Niimi | | H01H 50/443 335/2 |
| 2013/0133604 A1 * | 5/2013 | Gray | | F02N 11/0851 123/179.3 |
| 2013/0133605 A1 * | 5/2013 | Neet | | F02N 11/08 123/179.3 |
| 2013/0135065 A1 * | 5/2013 | Neet | | H01H 3/28 335/72 |
| 2013/0141192 A1 * | 6/2013 | Neet | | H01H 9/00 335/126 |
| 2013/0221682 A1 * | 8/2013 | Bradfield | | F02N 11/0855 290/38 C |
| 2013/0221683 A1 * | 8/2013 | Bradfield | | F02N 11/0851 290/38 R |
| 2014/0041613 A1 * | 2/2014 | Murata | | F02N 11/0844 123/179.3 |

* cited by examiner

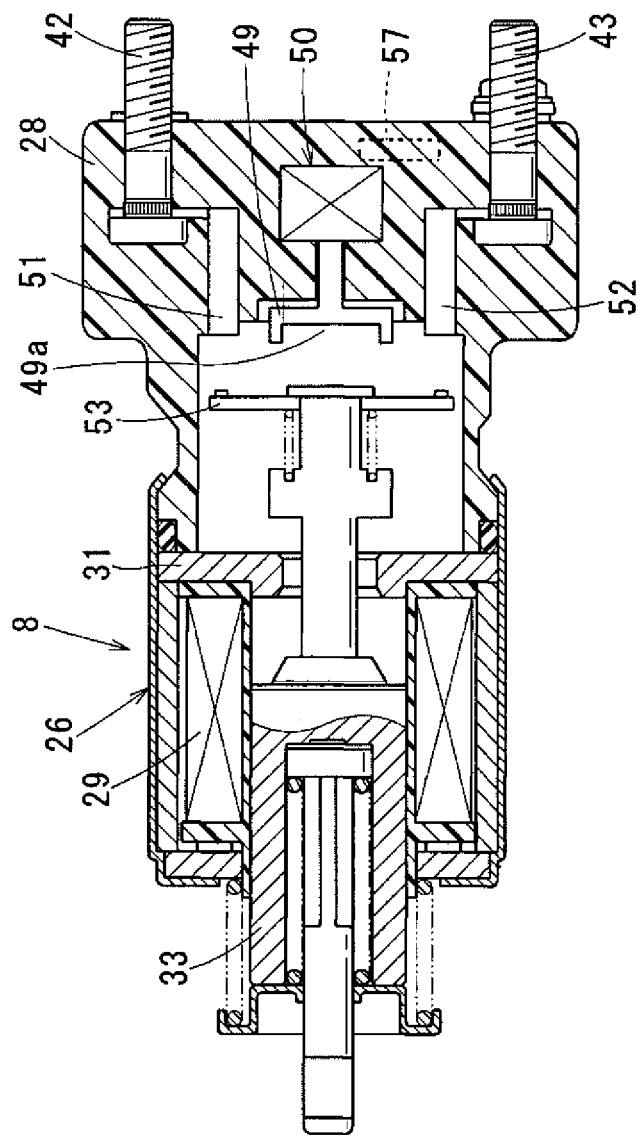

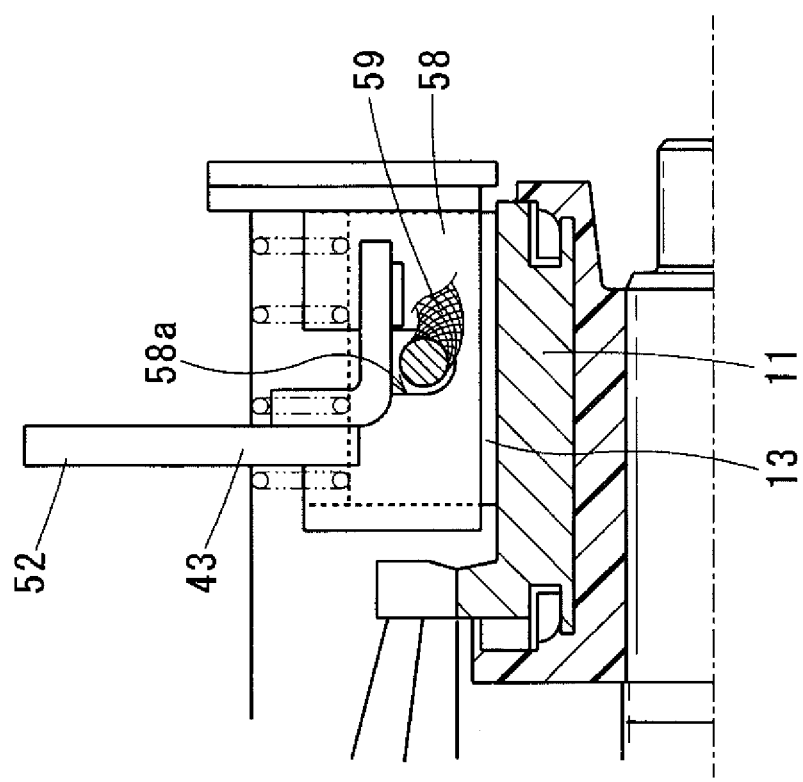

STARTER ADAPTED TO IDLE STOP SYSTEM OF VEHICLE

CROSS-REFERENCE TO RELATED APPLICATION

This application is based on and claims the benefit of priority from earlier Japanese Patent Application No. 2013-090303 filed Apr. 23, 2013, the description of which is incorporated herein by reference.

BACKGROUND

1. Technical Field

The present disclosure relates to a starter incorporating an electromagnetic solenoid unit which is used in an idle stop system.

2. Related Art

Recently, an increasing number of vehicles are equipped with an idle stop system (hereinafter referred to as "ISS" for short) which automatically controls stop and restart of an engine for the purpose, for example, of reducing carbon dioxide and enhancing fuel efficiency.

Starters based on conventional art are not able to restart an engine in a period following idle stop until complete stop of the engine, i.e. during rotation by inertia of the engine. The "starters based on conventional art" refers to those starters which use a single solenoid switch (referred to as "non-ISS switch" here) to push a pinion toward the ring gear of an engine and to open/close a main contact for the connection/disconnection of electric current supplied to the motor.

On the other hand, another type of well-known starter include, as disclosed in a patent document JP-A-2011-144799, for example, a tandem solenoid switch (hereinafter referred to as "ISS switch") which is able to restart an engine in response to a restart request of the driver when the engine rotating due to inertia.

Such an ISS switch includes a solenoid SL1 for pushing a pinion and a solenoid SL2 for opening/closing a main contact and is configured to independently control the activation of the solenoids SL1 and SL2. Specifically, the movement of the solenoid SL1 for pushing a pinion is controlled independent of the movement of the solenoid SL2 for opening/closing a main contact. Therefore, when the engine is rotating due to inertia, the pinion can be brought into engagement with the ring gear for the restart of the engine.

However, in the ISS switch based on conventional art, the solenoids SL1 and SL2 are independently activated, irrespective of their order of activation. Therefore, both of the solenoids SL1 and SL2 require to have a heat capacity that can tolerate continuous current supply equivalent to "rated actuation time+margin" of the starter. This raises a problem that the solenoids SL1 and SL2 will have a large size in order to ensure their heat resistance.

Further, since the solenoids SL1 and SL2 are both controlled by a vehicle-side ECU, two terminals (hereinafter referred to as "terminals-50") are necessary for passing current to both of the solenoids SL1 and SL2. Specifically, since the terminal-50 for the solenoid SL1 and the terminal-50 for the solenoid SL2 are separately provided, the connector of the terminals-50 will have a large size. This not only leads to the difficulty of mounting the starter on a vehicle, but also to the increase of the cost incurred in the ISS because there is also a necessity of providing two systems of harness and starter relay for connection to the two terminals-50.

Further, in the ISS switch based on conventional art, the current value for holding the plunger of the solenoid SL1 is made larger than the corresponding current value in the non-ISS switch, in order to ensure pinion engagement performance which is equivalent to that of the non-ISS switch. Therefore, depending on the type of vehicles, the fuse capacity of each terminal-50 harness is required to be increased, or the diameter of a harness wire is required to be increased, and this raises a problem of increasing the cost incurred in the ISS.

SUMMARY

An embodiment provides a starter with a small and light electromagnetic solenoid unit that can afford idle stop.

As an aspect of the present disclosure, the starter includes a motor that generates rotational force by being energized; a pinion that transmits the rotational force of the motor to a ring gear of the engine when the pinion engages with the ring gear; and an electromagnetic solenoid unit that includes a main solenoid forming a main electromagnet when being energized. The electromagnetic solenoid unit is configured to push the pinion out towards the ring gear in response to a movement of the plunger moving in an axial direction when the plunger is pulled by the main electromagnet to be attracted by the fixed core. Also, the electromagnetic solenoid integrates a contact unit that controls current flowing into the motor to be ON and OFF.

The contact unit includes a motor power switch including a pair of fixed contacts disposed at a starting circuit of the motor and a movable contact driven by the main solenoid to open and close between the pair of fixed contacts; a regulation member disposed to be movable between a regulated position and a released position in which the regulated position regulates the movement of the movable contact not to contact with the pair of fixed contacts when the motor power switch is being closed and the released position releases the movement of the movable contact so as to allow the movable contact to contact with the pair of fixed contacts; and a sub solenoid forming a sub electromagnet when being energized, driving the regulation member to be at the regulated position when the sub electromagnet is ON and releasing the regulation member to be at the released position when the sub electromagnet is OFF.

The sub solenoid is configured to control the sub electromagnet to be ON and OFF such that the regulation member is driven to be at the regulated position before the motor power switch is closed when the main solenoid starts to operate, so as to regulate the movement of the movable contact and the regulation member is released to be at the released position when a predetermined time elapses after the plunger is attracted by the fixed core, so as to release the movement of the movable contact.

The electromagnetic solenoid unit incorporated in the starter of the present disclosure is able to regulate the movement of the movable contact by activating the small solenoid, before the main solenoid is activated to close the motor power switch, i.e. before the movable contact comes into contact with the pair of fixed contacts. Thus, a predetermined time lag is set in a period from when the pinion is pushed toward the ring gear until when the movable contact comes into contact with the pair of fixed contacts, thereby affording idle stop.

The small solenoid has a short operating time, i.e., activation time (e.g., more than approx. 10 millisecond and up to approx. 200 milliseconds) during which the regulation member is driven to the regulated position and returned to the released position. Thus, the amount of heat generated by the energization of the small solenoid is reduced to a large extent.

When driving the regulation member to the drive position to regulate the movement of the movable contact, the small solenoid will not regulate the movement of the plunger body of the main solenoid. Accordingly, the regulation force of the small solenoid required for regulating the movement of the movable contact does not have to exceed the attraction force of the main electromagnet that attracts the plunger. Thus, the size of the small solenoid is reduced.

Further, while the small solenoid is activated, i.e. while the movement of the movable contact is regulated by the regulation member, the movable contact is not in contact with the pair of fixed contacts. Accordingly, battery voltage will not be applied to the motor. Specifically, since no current is passed to the motor while the small solenoid is activated, battery voltage will not be drastically reduced due to inrush current. Accordingly, voltage drop due to inrush current does not have to be taken into account when the small solenoid is activated. Thus, the size of the small solenoid is further reduced.

In addition, the small solenoid is structured such that the regulation member is driven to the regulated position in an activated state where the sub electromagnet is formed. Accordingly, if an activation failure occurs in the small solenoid, i.e. when the small solenoid is not activated in spite of current being supplied, the regulation member will not be driven to the regulated position. In this case, activation similar to that of the non-ISS switch of conventional art is available. Accordingly, the possible activation failure in the small solenoid does not lead to start failure. Thus, an electromagnetic solenoid unit with high robustness can be configured.

BRIEF DESCRIPTION OF THE DRAWINGS

In the accompanying drawings:

FIG. 9 is a cross-sectional view illustrating an electromagnetic solenoid unit according to a second embodiment of the present disclosure; and FIG. 10 is a cross-sectional view illustrating a configuration around a brush, according to a third embodiment of the present disclosure.

DETAILED DESCRIPTION OF THE PREFERRED EMBODIMENTS

With reference to the accompanying drawings, hereinafter are described some embodiments of the present disclosure.

First Embodiment

Figure 1:
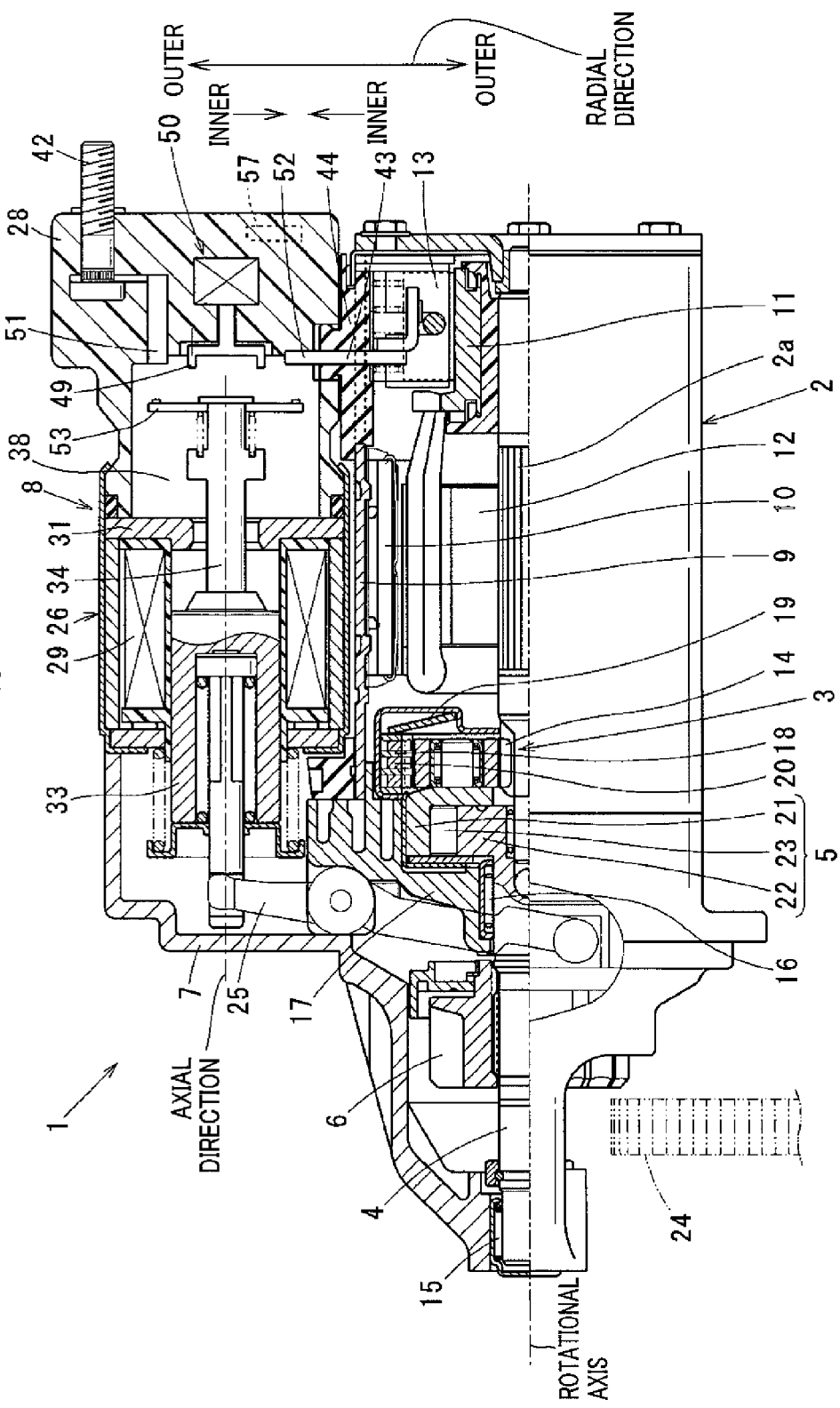
FIG. 1 is a half cross-sectional view illustrating a starter according to a first embodiment of the present disclosure.

Referring to FIGS. 1 to 8, a first embodiment of the present disclosure is described. FIG. 1 is a half cross-sectional view illustrating a starter 1 according to the first embodiment.

As shown in FIG. 1, the starter 1 includes a commutator motor 2, decelerator 3, output shaft 4, shock absorber (described later), clutch 5, pinion 6 and electromagnetic solenoid unit 8. The commutator motor 2 generates torque with the supply of electric current. The decelerator 3 decelerates the rotating speed of the motor 2. The output shaft 4 is connected to an armature shaft 2a of the motor 2 via the decelerator 3. The shock absorber absorbs any excessive shock transmitted from engine side. The clutch 5 transmits the torque generated by the motor 2 and amplified by the decelerator 3 to the output shaft 4. The pinion 6 is arranged on the output shaft 4. The electromagnetic solenoid unit 8 is fixed to a starter housing 7 together with the motor 2.

The motor 2 includes a field magnet unit, an armature 12 and a brush 13. The field magnet unit is configured by arranging a plurality of permanent magnets 10 in an inner periphery of a yoke 9 that forms a magnetic circuit. The armature 12 has the armature shaft 2a whose one end on a side opposite to the decelerator 3 (right side in the figure) is provided with a commutator 11. The brush 13 is arranged on an outer periphery of the commutator 11. Although FIG. 1 shows a permanent magnetic field, a magnetic field produced by an electromagnet may be used instead.

The decelerator 3 is a well-known planetary gear decelerator that receives rotation of the armature shaft 2a so that a plurality of planetary gears 14 can be in rotational motion or orbital motion.

The output shaft 4 is arranged being coaxial with the armature shaft 2a of the motor 2. An end of the output shaft 4 is rotatably supported by the starter housing 7 via a bearing 15, and the other end thereof is rotatably supported by a center case 17 via a bearing 16.

The shock absorber is configured by alternately arranging fixed plates 18 and friction plates 20. The rotation of the fixed plates 18 is regulated. The friction plates 20 are pressed by a disc spring 19 against the respective fixed plates 18 for frictional engagement therewith. When excessively large torque is transmitted from the engine side, the shock absorber absorbs the shock by allowing the friction plates 20 to slide (rotate) against the frictional force. The friction plates 20 are formed so as to also serve as internal gears of the decelerator 3.

The clutch 5 includes an outer race 21, an inner race 22 and a roller 23. The outer race 21 is rotated being transmitted with the orbital motion of the planetary gears 14. The inner race 22 is arranged on an inner peripheral side of the outer race 21 and integrated into the output shaft 4. The roller 23 connects or disconnects motive power between the outer race 21 and the inner race 22. The clutch 5 is configured as a one-way clutch that transmits rotating torque from the outer race 21 to the inner race 22 via the roller 23, and shuts down transmission of torque from the inner race 22 to the outer race 21 by idling the roller 23.

The pinion 6 is arranged, being fitted to the outer periphery of the output shaft 4 in a helical spline manner, so as to be movable on the output shaft. In starting the engine, the pinion 6 is engaged with an engine-side ring gear 24 (see FIG. 1) to transmit the rotating torque amplified by the decelerator 3 to the ring gear 24.

Figure 2:
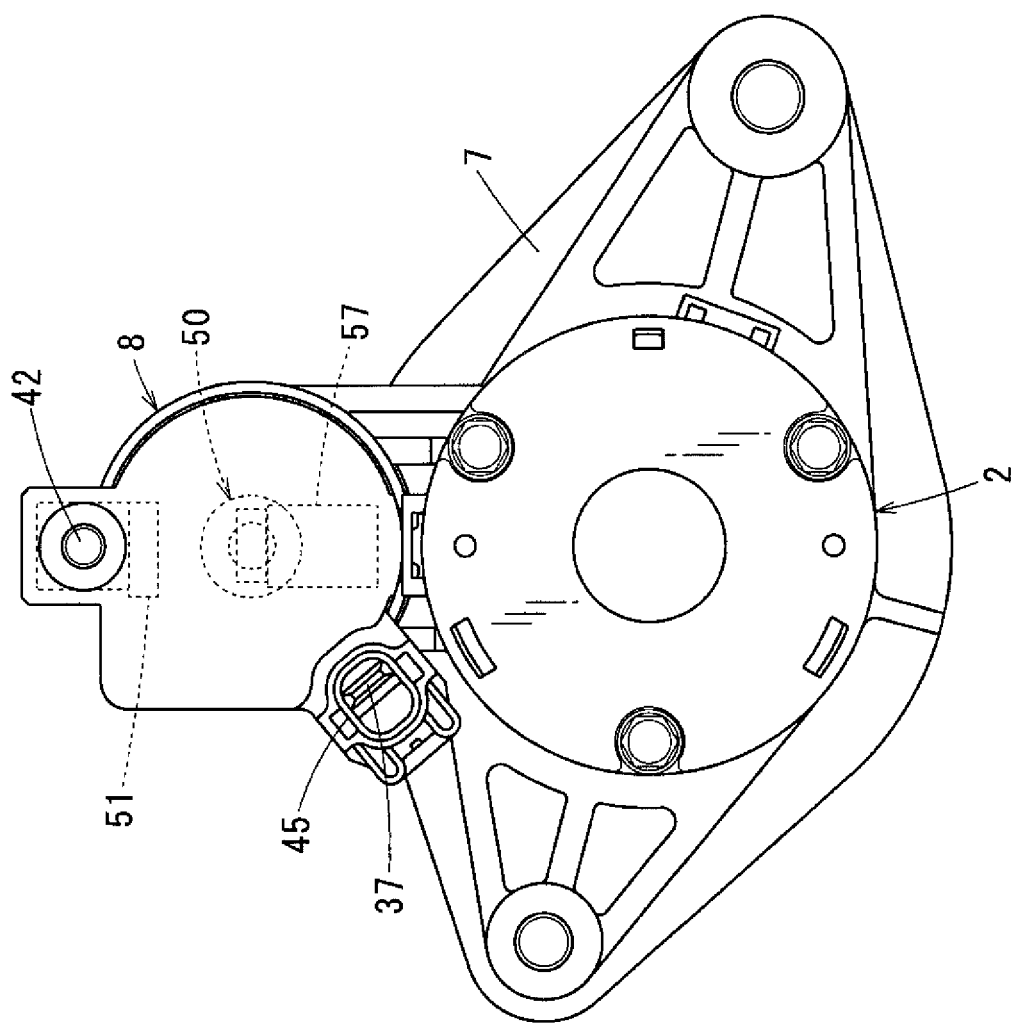
FIG. 2 is a rear view illustrating the starter as viewed in an axial direction opposite to a pinion.
Figure 3:
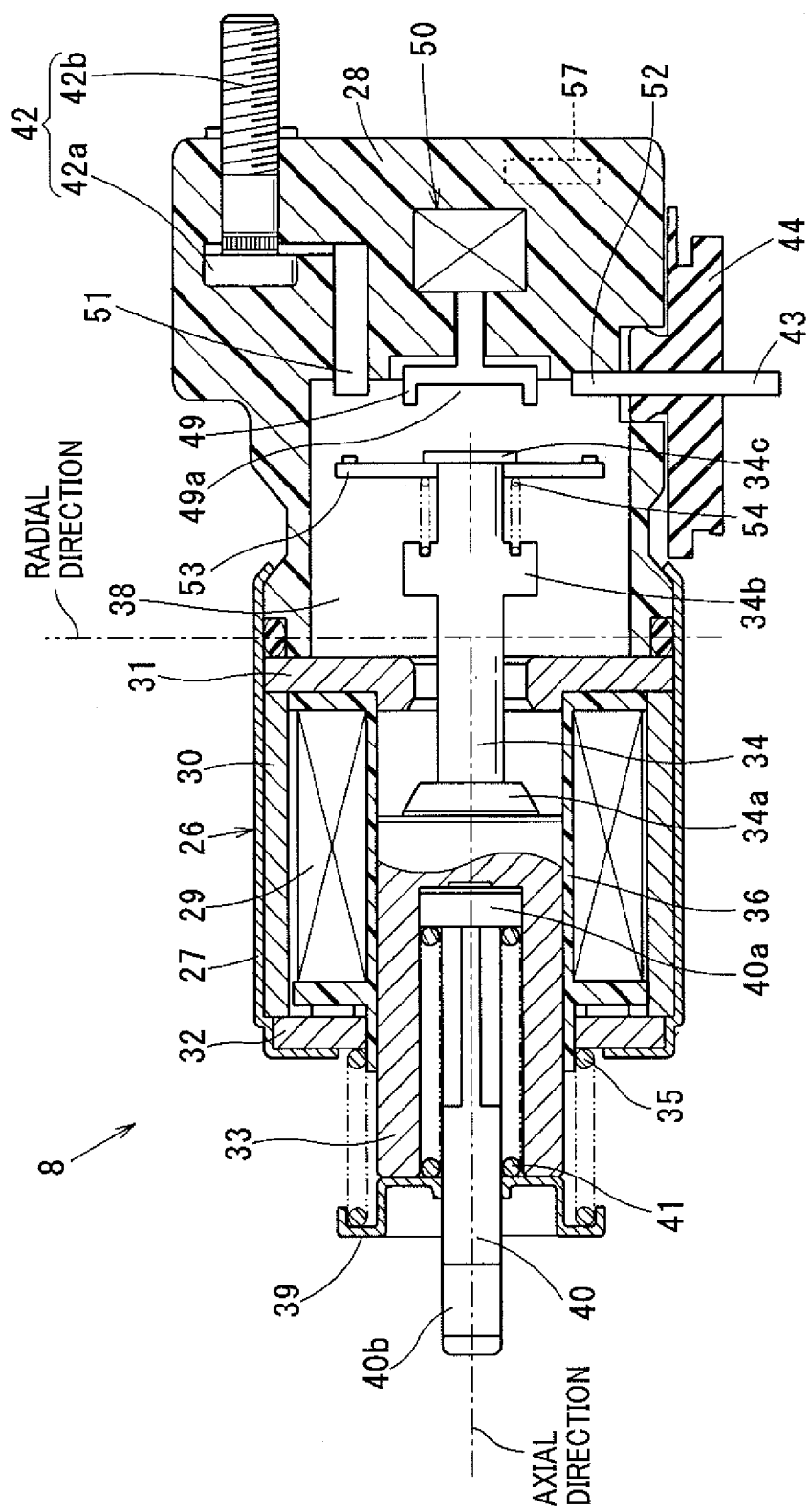
FIG. 3 is a cross-sectional view illustrating an electromagnetic solenoid unit incorporated in the starter.
Figure 4:
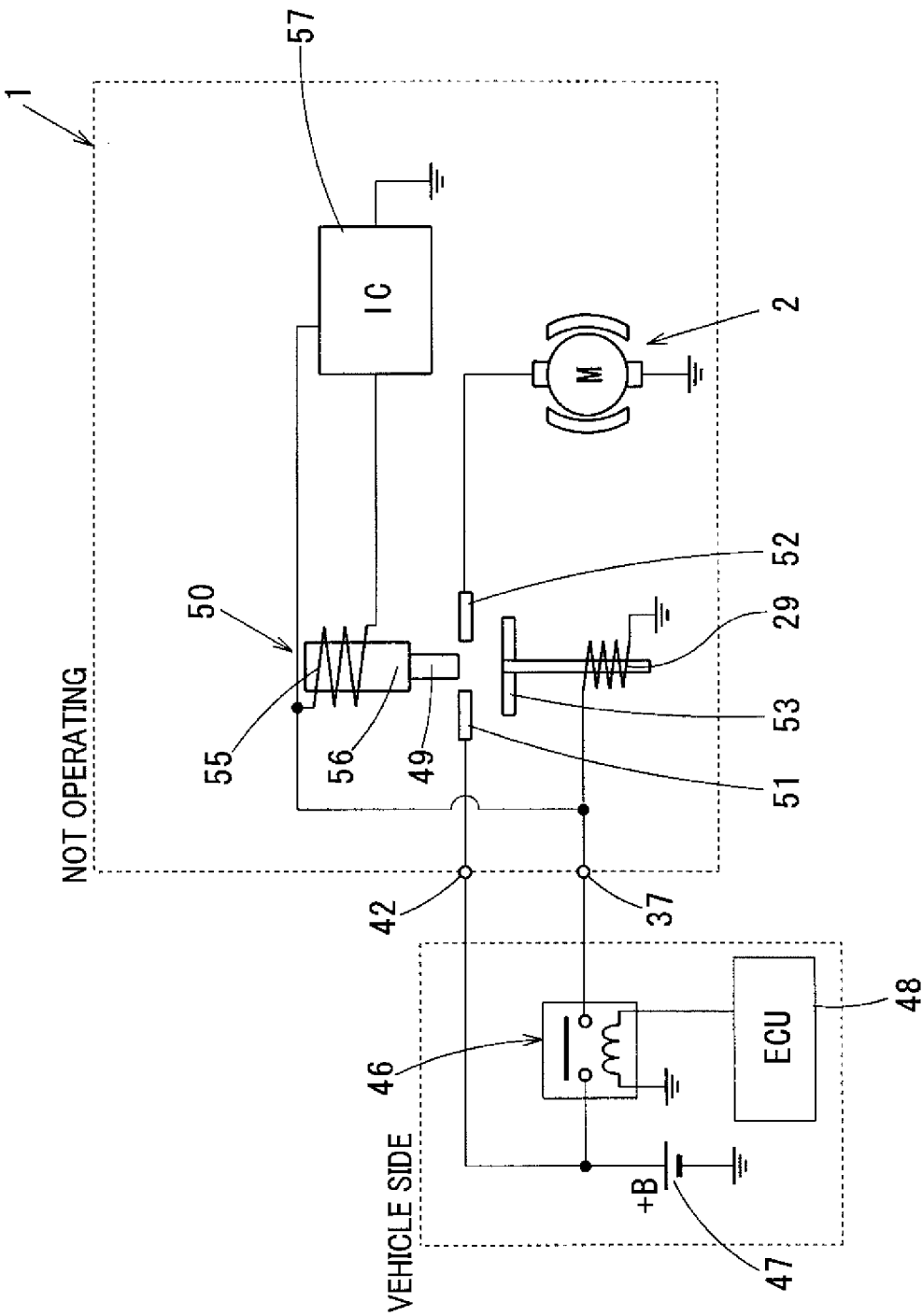
FIG. 4 is a circuit diagram illustrating the starter.

Referring to FIGS. 1 to 4, a configuration of the electromagnetic solenoid unit 8 is described. FIG. 2 is a rear view illustrating the starter 1 as viewed in an axial direction opposite to the pinion 6. FIG. 3 is a cross-sectional view illustrating the electromagnetic solenoid unit 8. FIG. 4 is a circuit diagram illustrating the starter 1.

In the following description, the left side of the electromagnetic solenoid unit 8 as viewed in FIG. 3 is referred to as "front end side" and the right side as viewed in FIG. 3 is referred to as "rear end side". Further, the axial direction is a direction in parallel to the rotational axis of the motor and the radial direction is the direction perpendicular to the axial direction. The axial direction and the radial direction are indicated in FIGS. 1 and 3.

As shown in FIG. 3, the electromagnetic solenoid unit 8 includes a main solenoid 26, a switch cover 28 and a contact unit. The main solenoid 26 drives a shift lever 25 (see FIG. 1) to push the pinion 6 toward the ring gear 24. The switch cover 28 is crimped and fixed to a cylindrical frame 27 that also serves as a magnetic circuit of the main solenoid 26. The contact unit is arranged inside the switch cover 28.

The main solenoid 26 includes a coil 29, cylindrical yoke 30, annular fixed core 31, fixed plate 32, plunger 33, plunger rod 34 and return spring 35. The coil 29 forms an electromagnet (hereinafter referred to as "main electromagnet") with the supply of electric current. The yoke 30 is arranged along the outer periphery of the coil 29. The fixed core 31 is arranged on the rear end side so as to butt against the coil 29. The fixed plate 32 is arranged on the front end side so as to butt against the coil 29. The plunger 33 is arranged along the inner periphery of the coil 29 so as to be movable in the axial direction. The plunger rod 34 is fixed to a rear end face of the plunger 33. The return spring 35 urges the plunger 33 in a direction opposite to the fixed core (leftward in FIG. 1 or 3).

The coil 29 is wound about a bobbin 36 made of a resin. As shown in FIG. 4, the coil 29 has a coil end which is connected to a supply terminal (referred to as "terminal-50 37" in the first embodiment) and the other coil end which is connected to the surface of the fixed core 31, for example, and grounded.

The yoke 30 has an axial rear end which is in contact with the fixed core 31 and has an axial front end which is in contact with the fixed plate 32 to thereby form a magnetic flux path between the fixed core 31 and the fixed plate 32 for passing magnetic flux therethrough.

As shown in FIG. 3, the fixed core 31 has a radially inner periphery which is thrust into the inner periphery of the bobbin 36 so as to face the plunger 33 in the axial direction. In other words, a part of the inner periphery of the fixed core 31 is extended in the radial direction with respect to the inner periphery of the bobbin 36, whereby the part of the inner periphery of the fixed core 31 faces the plunger 33 in the axial direction.

Similar to the fixed core 31, the fixed plate 32 is formed of a ferromagnetic material, such as iron, and is magnetized with the formation of the main electromagnet.

The plunger 33 is in a bottomed cylindrical shape, with a cylindrical hole being formed inside, the rear end side of the cylindrical hole being bottomed, and the front end side thereof being open.

The plunger rod 34 is provided with a flange 34a on the front end side in the axial direction. The flange 34a is fixed to an end face of the plunger 33 such as by welding or bonding. The plunger rod 34 is extended in the axial direction passing through a circular hole formed in the center portion of the fixed core 31. Thus, an end of the plunger rod 34 opposite to the plunger (rear end side) enters a contact chamber 38 formed inside the switch cover 28.

The return spring 35 has an axial rear end which is supported by an end face of the fixed plate 32 opposite to the coil, and an axial front end which is supported by a spring receiving seat 39 that is fixed to a front end face of the plunger 33.

Into the cylindrical hole formed in the plunger 33, a joint 40 and a drive spring 41 are inserted. The joint 40 has a function of transmitting the axial movement of the plunger 33 to the shift lever 25. The drive spring 41 is arranged on the outer periphery of the joint 40.

The joint 40 has an end on the rear end side, which is provided with a flange 40a. The flange 40a receives a load of the drive spring 41 and is pressed against the bottom of the cylindrical hole. The joint 40, which is projected from the cylindrical hole of the plunger 33, has a front end portion in which an engaging groove 40b is formed. An end of the shift lever 25 is in engagement with the engaging groove 40b in a two-pronged manner (see FIG. 1).

While the plunger 33 is attracted to the fixed core 31 magnetized by the main electromagnet, the drive spring 41 is compressed to store a reaction force for pushing the pinion 6 toward the ring gear 24.

The switch cover 28 is provided with two connecting terminals 42 and 43 that are connected to a starting circuit of the motor 2, and also provided with the terminal-50 37 attached thereto as mentioned above.

The connecting terminal 42 serves as a B terminal 42 to which a harness on the battery side is connected, and the connecting terminal 43 serves as an M terminal 43 which is connected to the motor 2 side.

As shown in FIG. 3, the B terminal 42 is in a bolt-like shape and has a bolt head portion 42a and an external thread portion 42b. The bolt head portion 42a is embedded in the switch cover 28 while the external thread portion 42b is axially projected from the rear end of the switch cover 28.

The M terminal 43 is formed of a plate member made of metal (e.g., copper), which is held by a grommet 44 made of rubber. The plate member is extended in the radial direction from inside the contact chamber 38 of the switch cover 28 into the interior of the motor 2. Specifically, as shown in FIG. 1, an end of the M terminal 43 projected from the grommet 44 is inserted into the contact chamber 38 through the side face of the switch cover 28, while the other end of the M terminal 43 projected from the grommet 44 is inserted into the interior of the motor 2 to establish electrical connection with the positive-side brush 13 inside the motor 2 via a metal plate or the like.

The terminal-50 37 is formed, for example, of a flat blade terminal. As shown in FIG. 2, only a single terminal is projected out of the switch cover 28 and surrounded by a connector 45 that is integrally formed with the switch cover 28 by resin molding. As shown in FIG. 4, a harness is connected to the terminal-50 37. The harness is connected to a battery 47 via a starter relay 46. When the starter relay 46 is closed, electric power is supplied from the battery 47.

After idle stop, when the engine is restarted in response to a restart request of the driver, the starter relay 46 is closed under the control of a vehicle-side ECU 48.

The contact unit includes a motor power switch (described later) and a small solenoid 50 (i.e., sub solenoid). The motor power switch turns on/off the current supplied to the motor 2. The small solenoid 50 drives a regulation member 49 to regulate the closing operation of the motor power switch.

The motor power switch is configured by a pair of fixed contacts 51 and 52, and a movable contact 53 that is opposed to the fixed contacts 51 and 52 and made movable in the axial direction. Of the fixed contacts 51 and 52, the fixed contact 51 is separately provided from the B terminal 42 but electrically connected to the B terminal 42. The other fixed contact 52 is formed integrally with the M terminal 43. Specifically, as shown in FIG. 3, one end of the M terminal 43 inserted into the contact chamber 38 through the side face of the switch cover 28 is formed into the fixed contact 52.

The movable contact 53 is fitted to the outer periphery of the plunger rod 34 that is thrust into the contact chamber 38. Thus, the movable contact 53 is held by the plunger rod 34 so as to be relatively movable in the axial direction, while being urged in a direction opposite to the plunger (rightward in FIG. 3) by a contact pressure spring 54. As shown in FIG. 3, the plunger rod 34 is integrally provided with a spring receiving portion 34b that supports an end (left end in FIG. 3) of the contact pressure spring 54. The plunger rod 34 has a rear end provided with a plunge plate 34c for retaining the movable contact 53 that is urged by the contact pressure spring 54. As a matter of course, the movable contact 53 is electrically insulated from the plunger rod 34. For example, for the electrical insulation, the movable contact 53 is fitted to the outer periphery of the plunger rod 34 which is made of a resin that serves as an insulator, or the movable contact 53 is assembled to the outer periphery of the plunger rod 34 via an insulating member.

As shown in FIG. 3, the regulation member 49 is arranged so as to axially face the movable contact 53. The regulation member 49 is driven to a "regulated position", which will be described later, when the small solenoid 50 is activated, and returns to a "released position" when the small solenoid 50 is deactivated. Further, the regulation member 49 is provided with a recess 49a that prevents interference in relation to the flange plate 34c in regulating the movement of the movable contact 53.

The "regulated position" of the regulation member 49 is described below. For the closing operation of the motor power switch, the regulation member 49 is used for regulating the movement of the movable contact 53 to thereby bring the movable contact 53 into contact with the regulation member 49, with a gap being formed for spacing the movable contact 53 apart from the fixed contacts 51 and 52. Thus, a non-contact relationship is created between the movable contact 53 and the fixed contacts 51 and 52. The position at which the non-contact relationship is created by the regulation member 49 is referred to as the "regulated position". Specifically, the "regulated position" resides in a position between the contact surface of the movable contact 53 and the contact surfaces of the fixed contacts 51 and 52 in a state where current is not passed to the main solenoid 26.

The "released position" refers to a position where the movement of the movable contact 53 is released from regulation and the movable contact 53 is allowed to contact the fixed contacts 51 and 52. Specifically, the "released position" resides in a position near the movable contact with reference to the contact surfaces of the fixed contacts 51 and 52 (i.e., anti-movable contact side).

As shown in FIG. 4, the small solenoid 50 includes a coil 55 and a small plunger 56. The coil 55 forms an electromagnet (hereinafter referred to as "sub electromagnet") when current is passed therethrough. The small plunger 56 is made movable in the axial direction in accordance with the on/off operation of the sub electromagnet. The regulation member 49 is interlocked with the movement of the small plunger 56. The expression "on/off operation of the sub electromagnet" is used as a synonym for "electrical connection/disconnection of the coil 55".

The small solenoid 50 pulls the small plunger 56 using the sub electromagnet to drive the regulation member 49 to the regulated position. In this regard, the small solenoid 50 is structured such that the small plunger 56 is attracted to a fixed core, not shown, prior to the establishment of contact between the movable contact 53 and the regulation member 49 (i.e., the small plunger 56 is attracted to a fixed core before the movable contact 53 comes into contact with the regulation member 49).

As a matter of course, when the movement of the movable contact 53 is being regulated by the small solenoid 50, the pressing load of the contact pressure spring 54 against the movable contact 53 is smaller than a regulation force with which the small solenoid 50 regulates the movement of the movable contact 53.

The activation time of the small solenoid 50, i.e. the on/off operation of the sub electromagnet, is controlled by an IC 57 incorporated in the electromagnetic solenoid unit 8. The IC 57 corresponds to the control circuit. As shown in FIG. 3, the IC 57 is arranged at a position axially opposite to the movable contact, with reference to the plate-like fixed contact 52 (that is integrally formed with the M terminal 43) which is inserted into the contact chamber 38 through the side face of the switch cover 28.

In the electromagnetic solenoid unit 8, when the starter relay 46 is closed, electric power is supplied from the battery 47 to the terminal-50 37 to pass electric current to the main solenoid 26, the small solenoid 50 and the IC 57 via the terminal-50 37. In other words, inside the switch cover 28, a wiring from the terminal-50 37 is branched to connect the main solenoid 26, the small solenoid 50 and the IC 57.

The operation of the starter 1 is described below.

Upon reception of an engine restart request, the ECU 48 closes the starter relay 46.

When the starter relay 46 is closed, current is passed from the battery 47 to the main solenoid 26, the small solenoid 50 and the IC 57 via the terminal-50 37.

In the main solenoid 26, when the main electromagnet is formed by the supply of current to the coil 29, the plunger 33 is attracted and moved to the fixed core 31 while pressing and contracting the return spring 35. With the movement of the plunger 33, the pinion 6 is pushed along the output shaft 4 in a direction opposite to the motor (leftward in FIG. 1) via the shift lever 25 so that the axial end face of the pinion 6 is brought into contact with the axial end face of the ring gear 24.

On the other hand, the movable contact 53 held by the plunger rod 34 moves toward the pair of fixed contacts 51 and 52.

In this case, the small solenoid 50 drives the regulation member 49 to the regulated position to regulate the movement of the movable contact 53, before the main solenoid 26 is activated and the motor power switch is closed. Specifically, the movable contact 53 is brought into contact with the regulation member 49 and regulated in the movement toward the fixed contacts. Then, the contact pressure spring 54 is compressed to allow the plunger rod 34, which is relatively movable with the movable contact 53, to keep moving in the recess 49a formed in the regulation member 49.

Figure 5:
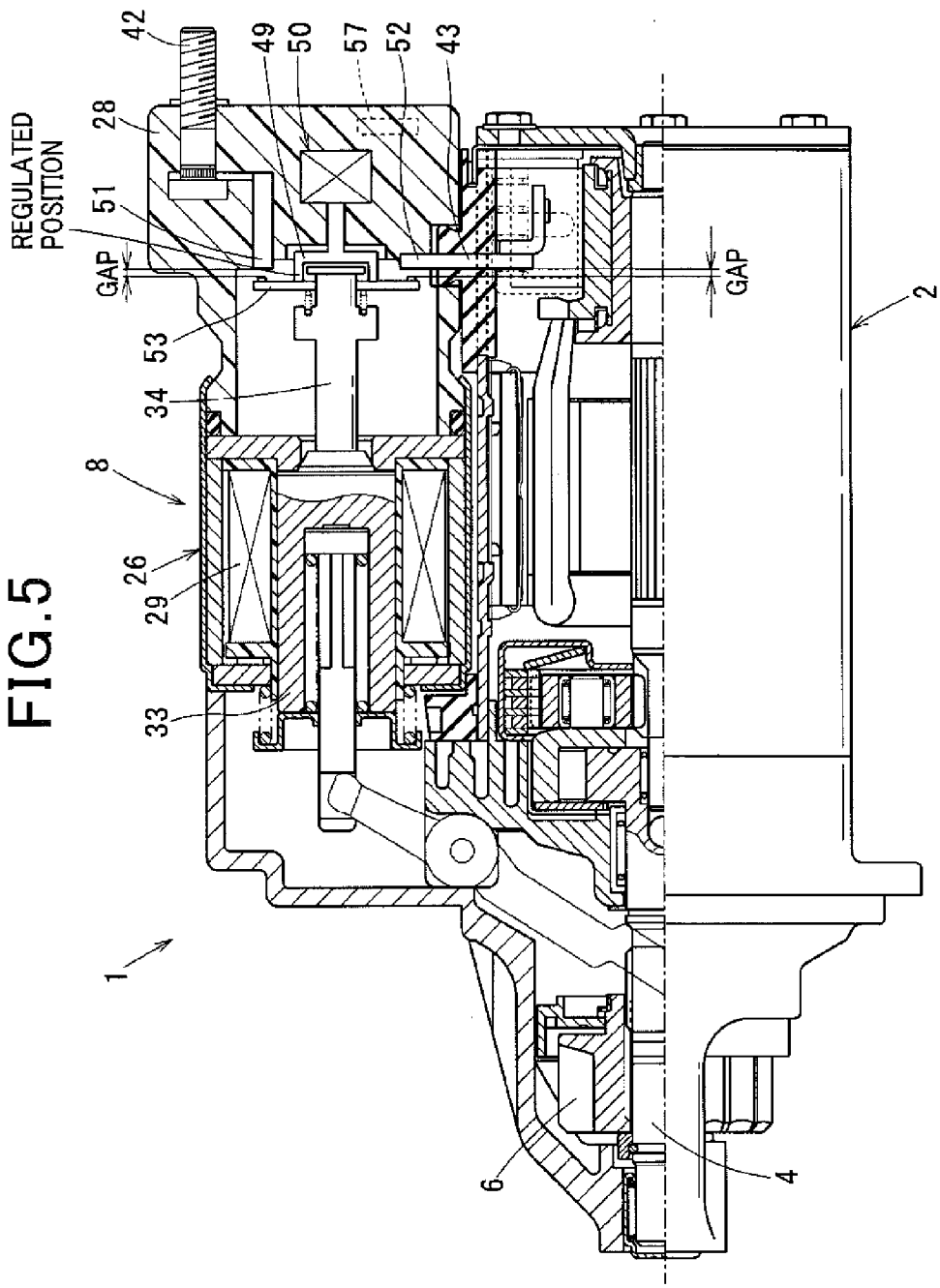
FIG. 5 is a half cross-sectional view illustrating the starter in a state where the movement of a movable contact is regulated by a small solenoid before a main solenoid is activated to close a motor power switch.

FIG. 5 illustrates a state where the regulation member 49 is at the regulated position. As shown in FIG. 5, resultantly, the motor power switch is brought into a state where the movable contact 53 is spaced apart from the fixed contacts 51 and 52 via a gap and this state is retained.

Then, after expiration of a predetermined period (e.g., more than approx. 10 millisecond and up to approx. 200 milliseconds) from when the plunger 33 of the main solenoid 26 has been attracted to the fixed core 31, current supply to the coil 55 is stopped to turn off the sub electromagnet.

Figure 6:
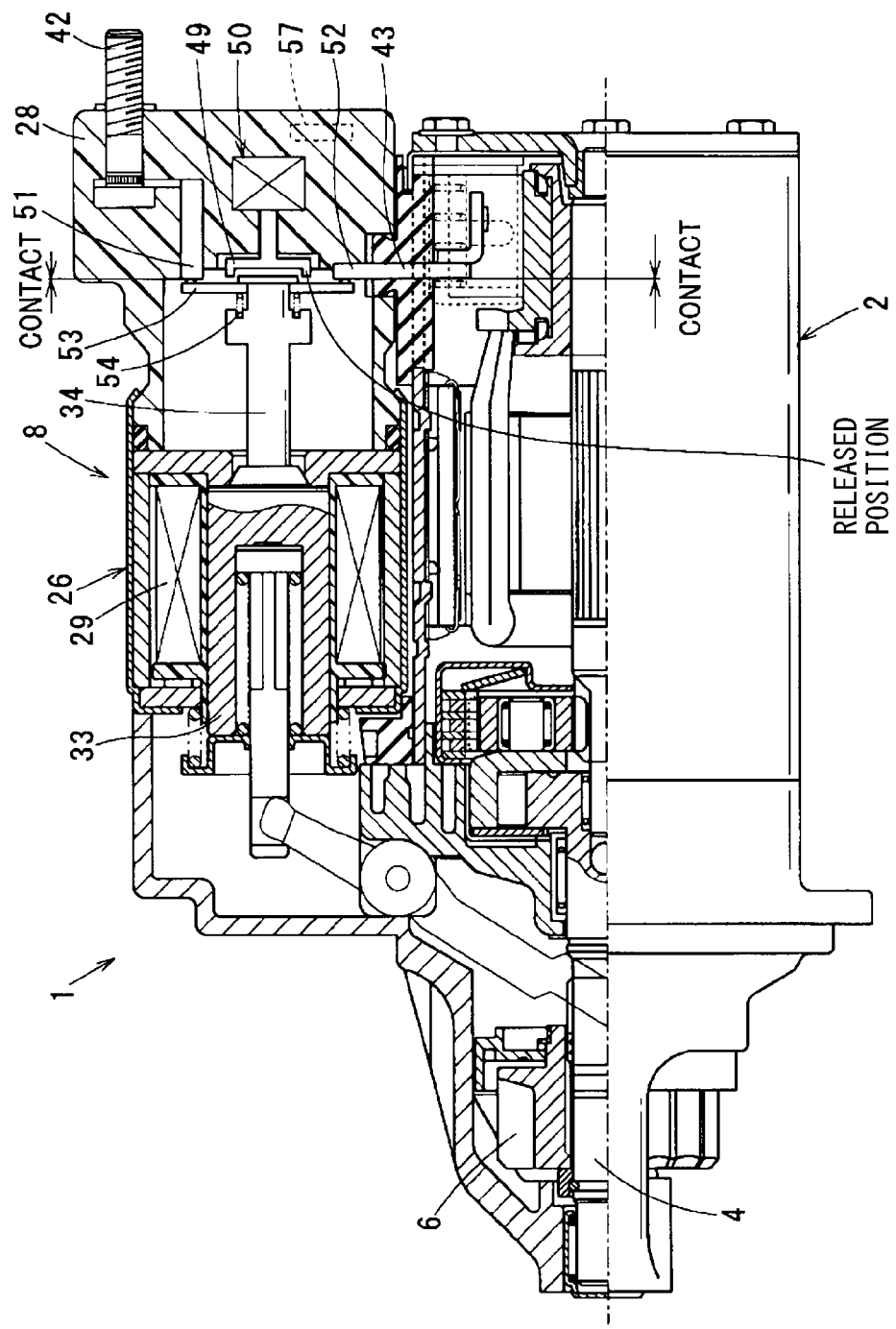
FIG. 6 is a half cross-sectional view illustrating the starter in a state where regulation in the movement of the movable contact has been released after the plunger of the main solenoid has been attracted.

Thus, upon deactivation of the small solenoid 50, the small plunger 56 is pushed back by the reaction force of a return spring, not shown, to allow the regulation member 49 to return to the released position. Thus, the movement of the movable contact 53 is released from regulation. FIG. 6 illustrates a state where the regulation member 49 is at the released position. As shown in FIG. 6, resultantly, the movable contact 53 comes into contact with the fixed contacts 51 and 52 and thus urged by the contact pressure spring 54 to thereby close the motor power switch.

Figure 7:
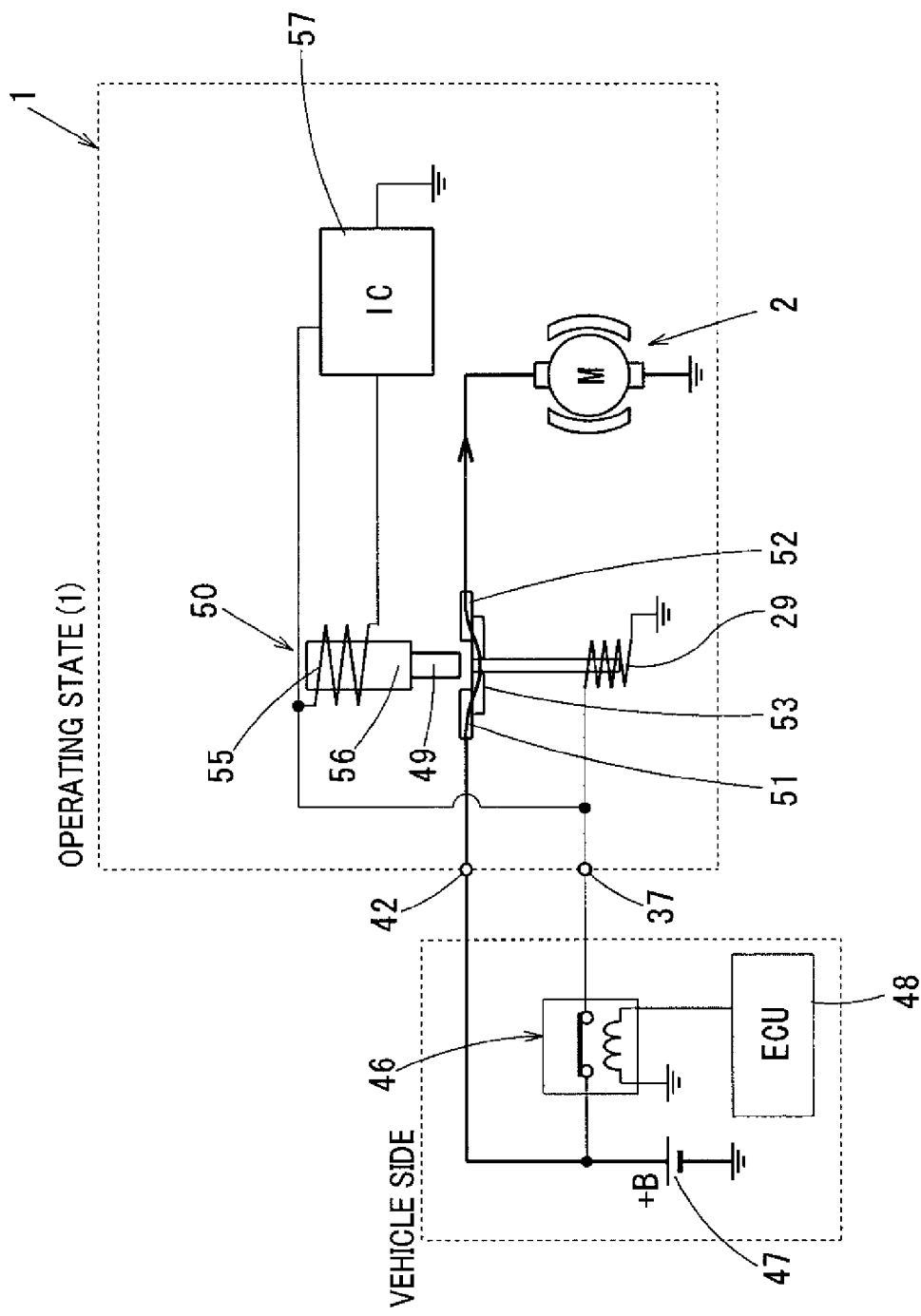
FIG. 7 is a circuit diagram illustrating the starter, the diagram corresponding to FIG. 6.

FIG. 7 is a circuit diagram illustrating the starter 1. As shown in FIG. 7, when the motor power switch is closed as described above, current is supplied from the battery 47 to the motor 2 to generate torque in the motor 2. Then, with the transmission of the torque, the pinion 6 is rotated to a position that enables engagement with the ring gear 24. Specifically, the pinion 6 is rotated to a position at which each tooth on one side coincides with a space between teeth on the other side to thrust the tooth into the space. Thus, the pinion 6 engages with the ring gear 24 to crank the engine.

Advantageous Effects of the First Embodiment

The starter 1 is able to set a predetermined time lag from when the pinion 6 has contacted the ring gear 24 until when the motor power switch is closed. Thus, the motor power switch is closed for the start of rotation of the motor 2 at an appropriate timing after the end face of the ring gear 24, which is in rotation by inertia, has contacted the end face of the pinion 6. Therefore, idle stop is coped with in a manner similar to the ISS switch of conventional art. For example, the starter 1 can support a "change-of-mind" or an "idle stop during deceleration" as explained below.

Figure 8:
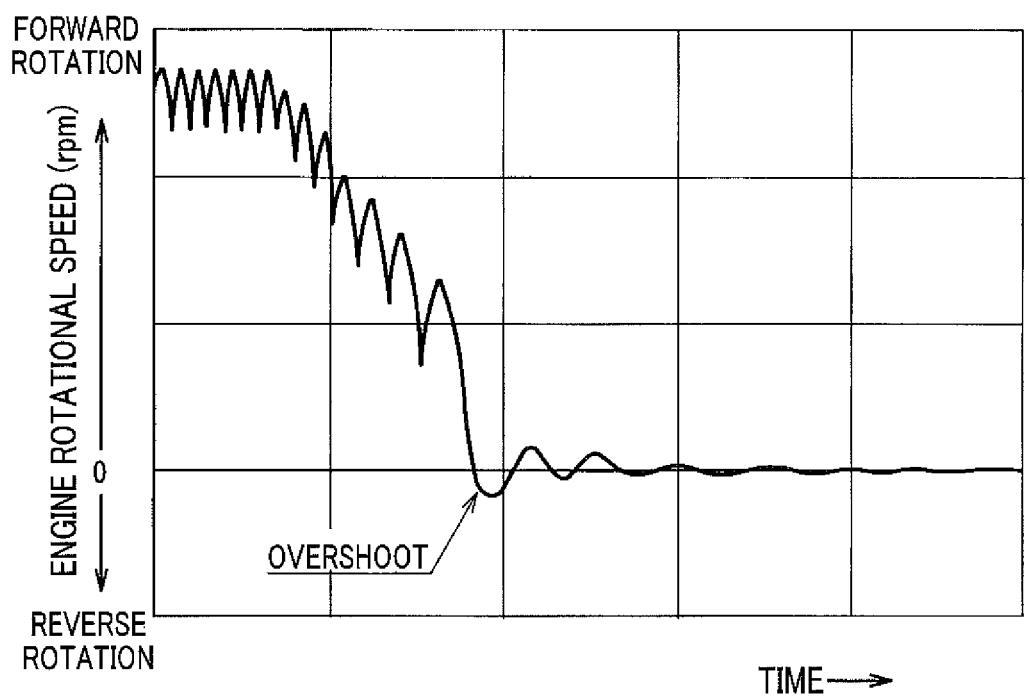
FIG. 8 is a graph of engine speed, showing a state of overshoot (inverse rotation) immediately before engine stop.

The term "change-of-mind" is explained, referring to FIG. 8 as an example. FIG. 8 is a graph of engine speed, showing a state of overshoot (inverse rotation) immediately before engine stop. As shown in FIG. 8, immediately before the engine is stopped, overshooting occurs once and the engine is inversely rotated. In a state where the engine is not completely stopped, including the range of the inverse rotation, the driver may request restart of the engine. The "change-of-mind" refers to restarting the engine, in such a state, in response to this driver's restart request.

The "idle stop during deceleration" refers to restarting the engine before the vehicle completely stops, i.e. restarting the engine in response to the driver's restart request during a deceleration period before the vehicle speed becomes zero.

The small solenoid 50 incorporated in the electromagnetic solenoid unit 8 has a short activation time (e.g., more than approx. 10 millisecond and up to approx. 200 milliseconds). Therefore, compared to the solenoids SL1 and SL2 used in the ISS switch of conventional art, the amount of heat generated by energization can be reduced to a large extent. Accordingly, the small solenoid 50 is not required to have heat resistance equivalent to that of the solenoid SL1 or SL2 of the ISS switch. As a result, the size of the small solenoid 50 can be reduced.

In regulating the movement of the movable contact 53 by driving the regulation member 49 to the regulated position, the small solenoid 50 does not regulate the movement of the plunger 33 of the main solenoid 26. Therefore, the regulation force of the small solenoid 50 required for regulating the movement of the movable contact 53 does not have to exceed the attraction force of the main electromagnet that acts on the plunger 33. Accordingly, the size of the small solenoid 50 can be reduced.

Further, while the small solenoid 50 is activated, i.e. while the movement of the movable contact 53 is regulated by the regulation member 49, the movable contact 53 is not in contact with the fixed contacts 51 and 52. Therefore, during this period, the battery voltage will not be applied to the motor 2. Specifically, since current is not passed to the motor 2 while the small solenoid 50 is activated, the battery voltage will not be lowered to a large extent due to inrush current. Accordingly, voltage drop due to inrush current does not have to be taken into account in activating the small solenoid 50. Thus, the size of the small solenoid 50 can be reduced.

The small solenoid 50 is structured such that the small plunger 56 is pushed out in an activated state where the sub electromagnet is formed to drive the regulation member 49 to the regulated position. Therefore, in the event that the small solenoid 50 has an activation failure, i.e. when the small solenoid 50 is not activated in spite of being supplied with current, the regulation member 49 will not be driven to the regulated position. In this case, activation similar to that of the conventional non-ISS switch is available. In other words, the activation failure of the small solenoid 50 does not immediately lead to a start failure. Thus, the electromagnetic solenoid unit 8 of light weight with high robustness can be configured.

Further, the small solenoid 50 is structured such that, in attracting the small plunger 56 to drive the regulation member 49 to the regulated position, the small plunger 56 is attracted to the fixed core before the movable contact 53 comes into contact with the regulation member 49. Thus, the small solenoid 50 can reduce the regulation force that is necessary for regulating the movable contact 53 via the regulation member 49. Specifically, the regulation force required for the small solenoid 50 may only have to be achieved by the attraction force between the small plunger 56 and the fixed core, not shown, this attraction force being larger than the attraction force of the sub electromagnet that attracts the small plunger 56 distanced from the fixed core. Accordingly, the attraction force of the small solenoid 50 can be set to a lower level than in the case where the movable contact 53 is regulated by the small plunger 56 distanced from the fixed core. This contributes to reducing the size of the small solenoid 50.

The small solenoid 50 for regulating the movement of the movable contact 53 may only have to have a regulation force that is larger than the pressing load of the contact pressure spring 54 that presses the movable contact 53. In other words, the regulation force may be of a level that only exceeds the pressing load of the contact pressure spring 54 that presses the movable contact 53. Accordingly, the size of the small solenoid 50 can be reduced.

The electromagnetic solenoid unit 8 of the first embodiment includes the IC 57 that controls the activation time of the small solenoid 50. Since the IC 57 is arranged inside the switch cover 28, the timing of opening/closing the motor power switch does not have to be controlled on the vehicle side, but the timing can be solely controlled by the starter 1. In this case, the control on the vehicle side may be the same as the activation control of the starter 1 incorporating the non-ISS switch. Thus, the control of the ISS can be simplified.

The vehicle-side ECU 48 is not required to independently control the activation of the main solenoid 26 and the activation of the small solenoid 50. Therefore, the terminal-50 37 is not required to be configured by two terminals as in the ISS switch. Specifically, similar to the non-ISS switch, the terminal-50 37 can be configured by a single terminal. Thus, inside the switch cover 28, the terminal-50 37 can be branched for connection with the main solenoid 26, the small solenoid 50 and the IC 57. Thus, the harness and the starter relay 46 on the vehicle side are not required to be configured with two systems. Instead, similar to the non-ISS switch, one set of the harness and the starter relay 46 can configure the switch and thus the ISS can be configured at low cost. Further, owing to the single-terminal configuration of the terminal-50 37, the connector 45 of the terminal-50 37 may be in the same shape as that in the non-ISS switch. Accordingly, unlike the ISS switch, the connector 45 will not have a large size and thus is advantageous in terms of installability.

In the first embodiment, the M terminal 43 is formed of a metal plate member that has an end inserted into the contact chamber 38 through the side face of the switch cover 28 and has the other end inserted into the motor 2 to establish an electrical connection with the positive-side brush 13. In this case, compared to the case where the M terminal 43 is in a bolt-like shape as is the B terminal 42, a space for arranging the IC 57 is ensured in a place where the bolt-like M terminal 43 would have been mounted being axially passed through the switch cover 28. Such an efficient arrangement of parts inside the switch cover 28 can contribute to reducing the size and weight of the electromagnetic solenoid unit 8.

Hereinafter, other embodiments (second and third embodiments) of the present disclosure will be described.

In the second and third embodiments, the components identical with or similar to those in the first embodiment are given the same reference numerals for the sake of omitting unnecessary explanation.

Second Embodiment

FIG. 9 is a cross-sectional view illustrating an electromagnetic solenoid 8 according to the second embodiment of the present disclosure. As shown in FIG. 9, in the second embodiment, the M terminal 43 is in a bolt-like shape similar to the B terminal 42 of the first embodiment.

In this case, the coil 55 of the small solenoid 50 has a negative side that can be easily connected, in the switch cover 28, to the M terminal 43. Thus, the coil 55 can be connected to the ground through the M terminal 43 via the motor 2.

The IC 57 that controls the activation time of the small solenoid 50 is serially connected in an activation circuit of the small solenoid 50. Specifically, the IC 57 is connected between the small solenoid 50 and the ground, or between the terminal-50 37 and the small solenoid 50.

Similar to the ISS switch or the non-ISS switch of conventional art, the M terminal 43 in a bolt-like shape of the second embodiment has an external thread portion axially projected from the switch cover 28. The external thread portion is connected to the terminal of a motor lead (not shown). The motor lead has an end opposite to the terminal, which is passed through a grommet, not shown, and inserted into the interior of the motor 2 to establish electrical connection with the positive-side brush 13. Thus, the electromagnetic solenoid unit 8 has a simple structure that enables easy connection of the small solenoid 50 inside the switch cover 28 and enables easy assemblage of the switch cover 28 to the main solenoid 26.

Third Embodiment

In the third embodiment, the coil 55 of the small solenoid 50 is connected to the M terminal 43 similar to the second embodiment to effectively use the starter 1 nearly to the end of the operating life of the brush 13.

In the starter 1 that uses the commutator motor 2, the operating life of the brush 13 in terms of wear cannot be correctly detected. Therefore, the starter 1 of the present embodiment is engineered such that the number of activations of the starter 1 is counted on the vehicle side and that, when the count has reached a predetermined number, the driver is advised of the change of the starter 1. In this case, since the brush 13 is designed to have enough margin in its operating life to meet the estimated operating life (i.e., not less than number of estimated operating times) of the starter 1, the brush 13 cannot be used effectively until the operating life thereof.

On the other hand, when the brush 13 is worn out and has almost reached the end of the operating life, the contact pressure between the commutator 11 and the brush 13 is decreased to drastically increase the electrical contact resistance. Therefore, the performance of the motor 2 is impaired. However, normally, the starter 1 is set so as to use a maximum or nearly maximum output when temperature is low. Therefore, the starter 1 has a considerable margin in its performance required for restarting the engine particularly in the vicinity of a normal temperature. Accordingly, when the brush 13 has been worn out and nearly reached the end of operating life and thus the performance of the motor 2 has started to be impaired, the engine can still be started.

Therefore, it is configured such that the contact between the commutator 11 and the brush 13 becomes unstable before the brush 13 is worn out and nearly reaches the end of operating life and also before the motor 2 is disabled from starting the engine. FIG. 10 is a cross-sectional view illustrating a configuration around the brush 13 according to the third embodiment. Specifically, as shown in FIG. 10, the unstableness may be obtained by making use of the traction between a brush holder 58 that holds the brush 13 and a brush pigtail 59. More specifically, a U-shaped groove 58a is formed on a side face of the brush holder 58 to draw out the brush pigtail 59. Thus, when the brush 13 has been worn out and nearly reached the end of operating life, the brush pigtail 59 is ensured to be caught by the bottom portion of the U-shaped groove 58a.

In the small solenoid 50, the negative side of the coil 55 is connected to the M terminal 43 and grounded via the motor 2. Therefore, when the contact between the commutator 11 and the brush 13 becomes unstable, the small solenoid 50 can no longer be normally activated. Specifically, when the contact between the commutator 11 and the brush 13 becomes unstable, the drive voltage applied to the coil 55 is lowered and thus the small solenoid 50 can no longer obtain a regulation force required for regulating the movement of the movable contact 53. In this case, since the movement of the movable contact 53 is not regulated, the timing of closing the motor power switch is advanced. This will shorten the time from when the starter relay 46 is closed until when voltage drop occurs due to inrush current. The timing of occurrence of this voltage drop is detected by the vehicle-side ECU 48 to determine whether or not the small solenoid 50 is normally activated.

Specifically, the ECU 48 measures the time from when the starter relay 46 is closed until when voltage drop occurs due to inrush current and detects the timing of the occurrence of voltage drop on the basis of the measured time. When the detected timing is earlier than the timing in a normal state, the ECU 48 determines that the small solenoid 50 is not normally activated.

The ECU 48, when it determines that the small solenoid 50 is not normally activated, can warn the driver accordingly. Thus, if the brush 13 has been worn out and nearly reached its end of life, the driver can be advised of the change of the starter 1 while the starter 1 is still secure in life, or before the starter 1 is completely disabled from starting the engine. As a result, the starter 1 can always be effectively used until the starter 1 nearly reaches the end of life. Thus, the margin in the life of the brush is reduced and the starter 1 having further reduced size and weight can be provided. The ECU 48 corresponds to the operation determining unit.

In the above exemplification, when the contact between the commutator 11 and the brush 13 becomes unstable, the small solenoid 50 becomes unable to regulate the movement of the movable contact 53. As a result, the timing of occurring voltage drop due to inrush current is advanced, and this advancement of the timing is detected. Specifically, a situation prepared for is that no abnormality is caused in the small solenoid 50, but the drive voltage applied to the coil 55 is lowered, and thus the regulation force required for regulating the movable contact 53 is not obtained.

On the other hand, in the case where some abnormality is caused in the small solenoid 50 and the small plunger 56 is deactivated, the timing of closing the motor power switch is advanced as well, compared to the case where the small solenoid 50 is normally activated.

Accordingly, similar to the above exemplification, the timing of occurring voltage drop due to inrush current is detected by the ECU 48. When the timing is advanced compared to the timing in a normal state, it is determined that the small solenoid 50 is not normally activated.

If the small solenoid 50 is deactivated and the movement of the movable contact 53 can no longer be regulated as in this case, start failure is not immediately caused. However, deactivation of the small solenoid 50 increases the damage on the ring gear 24 at the time when the pinion 6 engages with the ring gear 24. Therefore, the wear of the ring gear 24 may be accelerated and thus engagement failure may be caused earlier than the timing that corresponds to the postulated number of activations of the starter 1. On the other hand, when the ECU 48 determines that the small solenoid 50 is not normally activated, the ISS activation may be prohibited to warn the driver of the abnormality. As a result, while the starter 1 is still secure in life, or before the wear of the ring gear 24 is increased more than expected, the driver can be advised to change the starter 1.

When the timing of occurring voltage drop due to inrush current is earlier than in a normal state, the ECU 48 is able to determine as well whether the contact between the commutator 11 and the brush 13 is unstable due to the wear of the brush 13, or whether abnormality has occurred in the small solenoid 50. For example, when the number of activations of the starter 1 has not reached a preset number of activations, the ECU 48 determines that some abnormality has occurred in the small solenoid 50, not that the contact with the commutator 11 is unstable due to the wear of the brush 13.

(Modifications)

In the second and third embodiments, the negative side of the coil 55 of the small solenoid 50 is connected to the M terminal 43 in a bolt-like shape. However, this shall not deny a configuration in which the negative side of the coil 55 is connected to the M terminal 43 of the first embodiment, i.e. the metal plate member. In other words, the M terminal 43 as a plate member may be provided with an engaging portion or the like for establishing easy connection with the negative side of the coil 55.

What is claimed is:

1. A starter for starting an engine mounted on a vehicle, the starter comprising:
   a motor that generates rotational force by being energized;
   a pinion that transmits the rotational force of the motor to a ring gear of the engine when the pinion engages with the ring gear; and
   an electromagnetic solenoid that includes a main solenoid including a plunger and a fixed core, the main solenoid forming a main electromagnet when energized, the electromagnetic solenoid pushing the pinion out towards the ring gear in response to a movement of the plunger moving in an axial direction of the electromagnetic solenoid when the plunger is attracted to the fixed core by the main electromagnet, the electromagnetic solenoid integrating a contact unit that controls current flowing into the motor to be ON and OFF, the contact unit including:
      a motor power switch including: (i) a pair of fixed contacts disposed at a starting circuit of the motor, and (ii) a movable contact driven by the main solenoid to open and close between the pair of fixed contacts;
      a regulation member configured to move between a regulated position and a released position, the regulated position regulating movement of the movable contact not to contact the pair of fixed contact when the motor power switch is being closed, the released position releasing movement of the movable contact so as to allow the movable contact to contact the pair of fixed contacts; and
      a sub solenoid forming a sub electromagnet when energized, the sub solenoid: (i) driving the regulation member to be at the regulated position when the sub electromagnet is ON, and (ii) releasing the regulation member to be at the released position when the sub electromagnet is OFF, the sub solenoid being configured to control the sub electromagnet to be ON and OFF such that the regulation member is: (1) driven to be at the regulated position before the motor power switch is closed when the main solenoid starts to operate so as to regulate the movement of the movable contact, and (2) released to be at the released position when a predetermined time elapses after the plunger is attracted by the fixed core so as to release the movement of the movable contact.

2. The starter according to claim 1, wherein:
   the sub solenoid includes a second plunger being pulled by the sub electromagnet thereby allowing the second plunger to move in the axial direction;
   the regulation member is configured to move together with the second plunger between the regulated position and the released position; and
   the second plunger is pulled by the sub electromagnet before the movable contact comes into contact with the regulation member thereby driving the regulation member to be at the regulated position.

3. The starter according to claim 1, wherein the starter includes a control circuit that controls an operating time of the sub solenoid.

4. The starter according to claim 3, wherein:
the electromagnetic solenoid includes a switch cover fixed to a frame of the main solenoid; and
the control circuit is disposed in the switch cover.

5. The starter according to claim 4, wherein:
the electromagnetic solenoid includes a supply terminal attached to the switch cover;
the supply terminal connects a harness to be supplied with power from a battery;
the supply terminal includes a single terminal configuration to connect the harness; and
a wiring from the supply terminal is branched to connect the main solenoid, the sub solenoid and the control circuit.

6. The starter according to claim 4, wherein:
the switch cover includes a B terminal and an M terminal fixed to the switch cover, the B terminal being electrically connected to one fixed contact of the pair of fixed contacts and a battery side of the starting circuit, and the M terminal being electrically connected to another fixed contact of the pair of fixed contacts and a motor side of the starting circuit; and
the sub solenoid includes a sub coil that forms the sub electromagnet when energized, a negative side of the sub coil is connected to the M terminal to be grounded via the motor.

7. The starter according to claim 6, wherein:
the motor includes a commutator and a brush, the motor is configured such that contact between the commutator and the brush becomes unstable before the motor loses a required performance for restarting the engine due to wear of the brush sliding on an outer periphery of the commutator; and
the sub solenoid is configured such that a driving voltage applied to the sub coil is decreased when the contact between the commutator and the brush becomes unstable, whereby the sub solenoid does not obtain required regulation force to regulate the movement of the movable contact by the regulation member.

8. The starter according to claim 7, wherein the motor is configured such that a brush pigtail of the brush is hooked at a brush holder that holds the brush, before the brush reaches an operating life thereof when the contact between the commutator and the brush becomes unstable.

9. The starter according to claim 6, wherein:
the M terminal is formed by a plate member made of metal;
one end side of the plate member is inserted into the switch cover to be integrated with the other fixed contact;
another end side of the plate member projects in a radial direction, which is perpendicular to the axial direction, from a side surface of the switch cover to be inserted into the motor and electrically connected to the brush inside the motor; and
the control circuit is disposed in the switch cover to be at an anti-movable contact side in the axial direction with respect to the other fixed contact.

10. An engine starting unit including the starter according to claim 1, the engine starting unit including a processor programmed to:
determine whether or not the sub solenoid operates properly when the engine is restarted from an idle stop condition;
measure a time from when the main solenoid and the sub solenoid are energized until when a voltage drop occurs due to inrush current in response to the movable contact coming into contact with the pair of fixed contacts;
detect a timing of an occurrence of the voltage drop based on the measured time; and
determine that the sub solenoid is not normally activated when the detected timing is earlier than a timing in a normal state.

11. An engine starting unit including the starter according to claim 2, the engine starting unit including a processor programmed to:
determine whether or not the sub solenoid operates properly when the engine is restarted from an idle stop condition;
measure a time from when the main solenoid and the sub solenoid are energized until when a voltage drop occurs due to inrush current in response to the movable contact coming into contact with the pair of fixed contacts;
detect a timing of an occurrence of the voltage drop based on the measured time; and
determine that the sub solenoid is not normally activated when the detected timing is earlier than a timing in a normal state.

12. An engine starting unit including the starter according to claim 3, the engine starting unit including a processor programmed to:
determine whether or not the sub solenoid operates properly when the engine is restarted from an idle stop condition;
measure a time from when the main solenoid and the sub solenoid are energized until when a voltage drop occurs due to inrush current in response to the movable contact coming into contact with the pair of fixed contacts;
detect a timing of an occurrence of the voltage drop based on the measured time; and
determine that the sub solenoid is not normally activated when the detected timing is earlier than a timing in a normal state.

* * * * *